United States Patent [19]
Wilbert et al.

[11] Patent Number: 5,403,627
[45] Date of Patent: Apr. 4, 1995

[54] PROCESS AND APPARATUS FOR TREATING A PHOTORECEPTOR COATING

[75] Inventors: John J. Wilbert, Macedon; William G. Herbert, Williamson; Ernest F. Matyi, Webster; Henry T. Mastalski, Webster; Eugene A. Swain, Webster; Peter J. Schmitt, Ontario; Alfred O. Klein, Rochester; Monroe J. Hordon, Pittsford; Gary J. Maier, Webster, all of N.Y.

[73] Assignee: Xerox Corporation, Stamford, Conn.

[21] Appl. No.: 71,087

[22] Filed: Jun. 4, 1993

[51] Int. Cl.⁶ .................. B05D 3/00; B05D 5/00; B05D 1/18
[52] U.S. Cl. .................. 427/554; 427/348; 427/271; 427/596; 219/121.84; 156/637; 156/643
[58] Field of Search .............. 427/554, 556, 560, 348, 427/349, 224, 225, 540, 271, 519 G; 219/121.84; 156/643, 637

[56] References Cited

U.S. PATENT DOCUMENTS

| | | |
|---|---|---|
| 3,749,878 | 7/1973 | Sullivan et al. |
| 4,151,312 | 4/1979 | Compen |
| 4,530,896 | 7/1985 | Christensen et al. |
| 4,661,370 | 4/1987 | Tarrant ............ 427/75 |
| 4,685,975 | 8/1987 | Kottman et al. |
| 4,716,829 | 1/1988 | Wenzel ............ 427/57 |
| 4,739,591 | 4/1988 | Everhardus et al. |
| 4,776,904 | 10/1988 | Charlton et al. |
| 4,877,644 | 10/1989 | Wu et al. ......... 427/556 |
| 4,898,650 | 2/1990 | Wu et al. |
| 5,164,567 | 11/1992 | Gettemy ......... 219/121.84 |
| 5,187,967 | 2/1993 | Singh et al. |
| 5,199,342 | 4/1993 | Hediger |

FOREIGN PATENT DOCUMENTS

3-144458 6/1991 Japan.
3194131 2/1993 Japan.

OTHER PUBLICATIONS

IBM Technical Disclosure Bulletin, vol. 19, No. 6, Nov. 1976, pp. 2114–2115 "Remover For Peripheral Resist Build–Ups".
IBM Technical Disclosure Bulletin, vol. 33, No. 9, Feb. 1991, pp. 329–330 "Debris Elimination Following Laser Etching".
IBM Technical Disclosure Bulletin, vol. 33, No. 68, Nov. 1990, pp. 466–470 "Laser–Ablated Resist Via Inspection".
IBM Technical Disclosure Bulletin, vol. 12, No. 6, Nov. 1969, p. 735 "Laser Removal of Polymer Coating".

Primary Examiner—Shrive Beck
Assistant Examiner—Brian K. Talbot
Attorney, Agent, or Firm—Oliff & Berridge

[57] ABSTRACT

A process for treating a predetermined portion of a coating on a photoreceptor to remove at least part of the coating involves directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The at least one fluid medium is preferably at least one gas jet, liquid jet or a liquid solvent.

22 Claims, 6 Drawing Sheets

PROCESS AND APPARATUS FOR TREATING A PHOTORECEPTOR COATING

BACKGROUND OF THE INVENTION

The invention relates to processes and apparatus for removing coatings, and particularly to a process and apparatus for removing at least part of a coating from a predetermined portion of a photoreceptor.

In electrophotography, and particularly in xerographic copying machines, coated substrates such as photoreceptor belts or cylindrical photoreceptor drums are common. Photoreceptor embodiments include at least one coating of photosensitive material, which can be formed on the photoreceptor by known techniques such as immersion or dip coating.

The peripheral ends of a coated photoreceptor are used to engage with flanges in a copier's drive mechanism and/or to support a developer housing. Also, the ends are often treated to be electrically conductive. Thus, both the outer and inner peripheral ends of a photoreceptor must be free of coating material.

Conventionally, the ends of a photoreceptor are masked before coating to prevent them from being coated. In dip coating, the upper end of the photoreceptor drum might be kept free of coating material by orienting the drum vertically and dipping the drum into a bath of coating material to a predetermined depth. However, the coating formed over the lower end of the photoreceptor must still be removed, usually by mechanically wiping the lower end and/or by applying solvents to it. Chemical treatments can cause solvent droplets or vapor to contact the coating in regions that are not intended to be removed, reducing the quality of the resulting photoreceptor. Furthermore, organic solvents have a limited useful life and can be hazardous to work with. Mechanical techniques for removing coatings are cumbersome, inefficient, and often produce photoreceptors of unacceptable quality.

Japanese Publication No. 3-144,458 discloses a process that attempts to remove coatings from the ends of a photoreceptor without mechanical or chemical treatment. A laser beam from an yttrium-aluminum-garnet laser is irradiated at the end portions of a photoreceptor drum to burn or sublimate the photoreceptor coating. Japanese Publication No. 3-194,131 discloses a similar process in which laser energy is directed at the ends of a photoreceptor in an effort to completely remove the coating.

Although these laser treatment processes are intended to completely remove coatings, it has been found that many materials commonly used in photoreceptor coatings are melted, rather than vaporized, by these processes. The molten coating subsequently hardens and must be removed by chemical or mechanical means. Moreover, burning the coating with a high-intensity laser can damage the photoreceptor substrate. These processes therefore yield less than satisfactory results in many instances.

SUMMARY OF THE INVENTION

The invention provides a process for treating a predetermined portion of a coating on a photoreceptor to remove at least part of the coating by directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The removal of the coating material is assisted with at least one fluid medium, preferably at least one gas jet, liquid jet or a liquid solvent. The process eliminates the need to chemically or mechanically treat photoreceptor coatings to successfully remove at least part of the coating, without the disadvantages of known techniques. The process is most preferably used to completely remove all of the coating layers from the peripheral ends of a photoreceptor.

BRIEF DESCRIPTION OF THE DRAWINGS

Preferred embodiments of the invention will be described, by way of example, with reference to the accompanying drawings, in which.

DESCRIPTION OF PREFERRED EMBODIMENTS

The invention relates to a process for treating a predetermined portion of a coating on a photoreceptor to remove at least part of the coating by directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The fluid medium is preferably at least one gas jet, liquid jet, or a liquid solvent. The fluid medium preferably exerts sufficient force on the coating to assist in the removal of the coating material, such that subsequent chemical or mechanical treatment of the coating is unnecessary.

A preferred process according to the invention involves treating a predetermined portion of a coating on a photoreceptor to remove at least part of the coating by directing a laser beam and at least one fluid jet at the coating to remove at least part of the coating. This process will be referred to as "laser ablation." The laser ablation process functions to effectively remove at least part of a predetermined portion of a coating without the need for chemical or mechanical treatments. The process is useful for treating a variety of types of photoreceptors, including belt-type photoreceptors or cylindrical photoreceptor drums.

Figure 1:
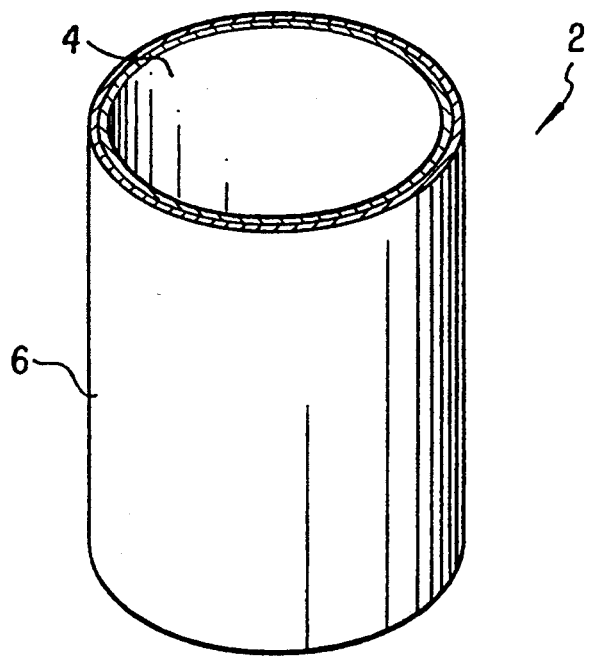
FIG. 1 shows a cylindrical photoreceptor having an outer coating to be treated according to the laser ablation embodiment of the invention.

For purposes of illustration, the process according to the invention will be described with reference to the treatment of a coated cylindrical photoreceptor. Referring to FIG. 1, a partially processed photoconductor drum 2 is shown. Drum 2 includes a rigid cylindrical substrate 4 having an outer coating 6 formed over the substrate. Substrate 4 can be made of any suitable material such as aluminum, nickel, zinc, chromium, conductive paper, stainless steel, cadmium, titanium, metal oxides, polyesters such as MYLAR®, and the like. Substrate 4 can be formed as one layer or as a plurality of layers, for example as a conductive layer coated over an insulating layer. The thickness of substrate 4 can vary widely depending on the intended use of the photoreceptor, and preferably is from about 65 $\mu$m to about 5 mm thick, most preferably from about 0.1 mm to about 1.5 mm thick.

The process removes various types of known photoreceptor coatings. Coating 6 can include one or a plurality of layers, and typically will include multiple layers such as an electrically conductive ground plane, a blocking layer, an adhesive layer, a charge generating (photogenerating) layer, a charge transporting layer and an overcoat layer. The process removes at least part of one coating layer. Preferably, all of the coating layers present at the outer and inner peripheral end regions of the photoreceptor are removed.

The layers of coating 6 are formed using well-known techniques and materials. For example, coating 6 can be applied to substrate 4 by vacuum deposition, immersion, spray coating, or dip coating. Dip coating or spray coating are preferred. Suitable coating techniques and materials are illustrated in U.S. Pat. Nos. 5,091,278, 5,167,987 and 5,120,628, the entire disclosures of which are incorporated herein by reference. The process of the invention can be carried out in conjunction with the coating process, after the coating has partially hardened. Preferably, laser ablation is performed after the coating has substantially or fully hardened.

Coating 6 preferably includes, as a photoconductive material, one or a plurality of layers of selenium, metal alloys, and/or organic resins carrying photoconductive materials. Organic photoconductor coatings are preferred. Such coatings include a photoconductive material such as pigments including dibromoanthanthrone, metal-free and metal phthalocyanines, halogenated metal phthalocyanines, perylenes, and azo pigments, carried in a suitable organic binder resin. Examples of useful organic binder resins include polycarbonates, acrylate polymers, vinyl polymers, cellulose polymers, polysiloxanes, polyamides, polyurethanes, polyesters, and block, random or alternating copolymers thereof.

Figure 2:
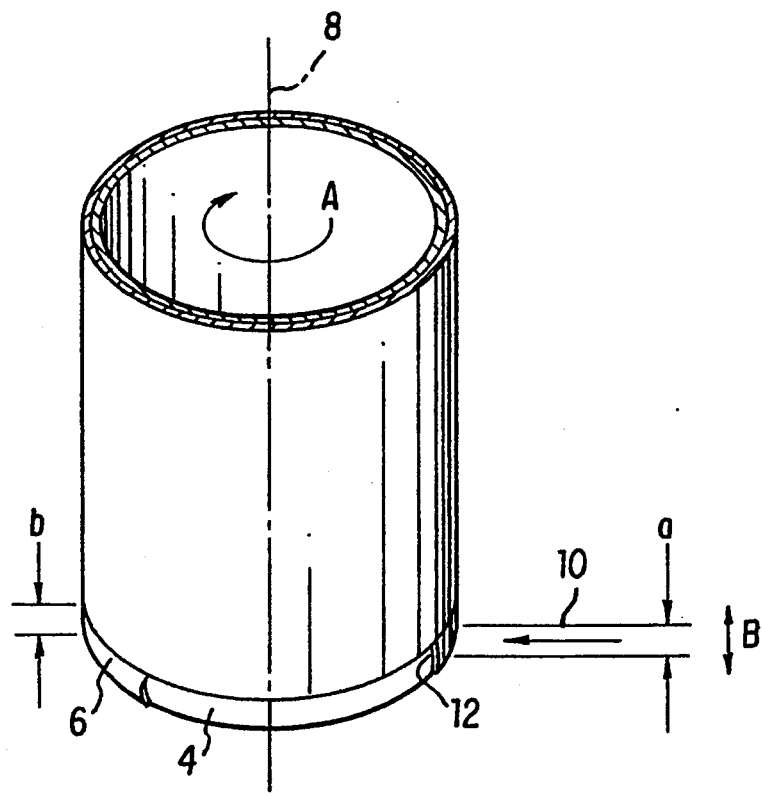
FIG. 2 illustrates the removal of a portion of the coating using laser irradiation according to the laser ablation embodiment of the present invention.

Referring to FIG. 2, drum 2 is preferably mounted such that its axis 8 is vertically oriented. Drum 2 is preferably mounted using a conventional chucking device coupled to a drive (not shown), so that drum 2 can be rotatably driven about axis 8 in the direction of arrow A. The photoreceptor is preferably rotated about axis 8 during the removal of the coating. A rotational speed of from about 400 rpm to about 4000 rpm is preferred.

As drum 2 is rotated, a laser beam 10 of width "a" from a conventional $CO_2$ laser (not shown) is directed at a predetermined portion of coating 6. The laser used in the process is preferably a continuous wave carbon dioxide laser. The inventors have found that $CO_2$ lasers provide a laser beam having a wavelength that is particularly well-absorbed by plastic binder resins commonly present in one or more layers of known photoreceptors. A $CO_2$ laser emitting a beam at a wavelength of about 10.6 $\mu$m has been found to work well for organic photoconductor films having polycarbonate binders. Carbon dioxide continuous wave lasers are commercially available and require no special modification to be effective in carrying out the invention. Alternately, among others, a pulsed beam $CO_2$ laser, yttrium aluminum garnet (YAG) laser, or excimer laser could be used to carry out the laser ablation process.

The laser should have sufficient power to remove a desired amount of the particular coating to be treated. The inventors have discovered that the power of the $CO_2$ laser should be selected depending on the type of substrate present in the photoreceptor. Where the photoreceptor includes an aluminum substrate, a laser having a power of from about 800 W to about 2000 W, more preferably from about 1000 W to about 1500 W, has been found to provide preferred results. With a nickel substrate, a laser having a power of from about 100 W to about 400 W is preferred.

The laser beam should have a sufficient watt density to ablate the photoreceptor coating. An optical system is preferably used to concentrate the laser beam and provide the required watt density for a particular photoreceptor coating. However, laser beam systems are available that may not require an optical system to provide a laser beam having a sufficient watt density to ablate a photoreceptor coating. The focal length, focus, and angle of incidence of the laser affect the laser ablation process, and can be selected depending on the particular coating and the results intended. A focal length of about 5 inches and a surface focus or slightly off-surface focus are preferred. Most preferably, the laser has a focus tolerance of about ±0.75 mm from the point of sharp focus, in either direction.

The predetermined portion of coating 6 to be treated has a desired width "b". To provide a suitable coating-free area to support a developer housing or flange for a drive mechanism, width "b" is typically about 1 cm wide. The process could be used to ablate other widths of a photoreceptor coating. It may also be desirable to remove bands of the coating in one or more locations on the photoreceptor, or to remove circular or other shaped patterns of the coating.

Figure 6:
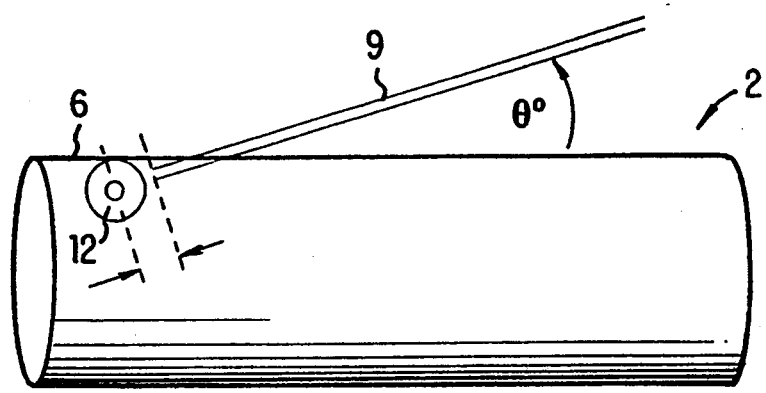
FIG. 6 shows a preferred positioning of the crossjet preferably used according to the laser ablation embodiment of the invention.

At a given moment during laser ablation, laser beam 10 impinges on a spot 12 such that at least part of the coating material in the area of spot 12 is rapidly heated and vaporized by laser beam 10. Part of coating 6 is typically melted by laser beam 10; this molten coating material is forced off of drum 2 by the action of a cross-jet nozzle 9 (FIG. 6).

The at least one fluid jet used in the process of the invention can be a cross-jet of fluid, a fluid jet coaxial with the laser beam, or preferably a combination of the two. Apparatus for supplying cross and coaxial fluid jets are commercially available and require no modification for purposes of the invention. The laser vaporizes and removes at least part of the coating. As discussed above, the inventors have found that the laser will often melt but not vaporize certain other materials in the coating. By applying a high-velocity stream of cross-jet fluid to the coating during laser treatment, the molten coating material is forced off the photoreceptor in a controlled manner. This permits all of the coating material to be removed from the predetermined region of the photoreceptor coating, without subsequent chemical or mechanical treatment.

Cross-jet gas preferably has a pressure of from about 20 psi to about 400 psi, most preferably from about 100 psi to about 300 psi.

The inventors have further discovered that supplying a coaxial fluid jet around the laser beam during laser treatment prevents debris from backing up into the laser during the ablation process. The coaxial fluid jet travels around the outside of the laser beam in the same direction as the beam. This protects the laser and increases the on-line production time of the laser ablation system. A coaxial gas jet preferably has a pressure in the range of from about 5 psi to about 150 psi, more preferably from about 20 psi to about 60 psi, measured near the point at which the gas exits from the jet nozzle. It will be understood that the pressure of the gas can be varied by controlling the nozzle orifice size and the speed of the gas exiting the gas jet nozzle. A suitable nozzle diameter is about 1.5 mm, but various diameters are useful. Preferably, the process uses both cross and coaxial gas jets.

The gas used in the cross-jet and/or coaxial jet is preferably air, but can be other gases such as nitrogen gas or pure oxygen gas, depending on the coating material and other laser ablation conditions. For example, if a highly reactive or potentially explosive coating is to be removed, an inert cross-jet or coaxial jet gas such as nitrogen gas can be used. Conversely, if additional oxidation of the coating during the laser ablation process is desired, pure oxygen gas or other reactive gas mixtures can be used.

In an alternative embodiment, a liquid cross jet could be used to assist the removal of the ablated photoreceptor coating. The liquid jet should have an orientation and pressure sufficient to impart about the same pressure on the ablated coating as the cross jet gas described above.

As drum 2 rotates during the laser ablation process, a circumferential strip of coating material 6 substantially the same width as the width "a" of the laser beam is removed, exposing the underlying cylindrical photoreceptor substrate 4. The laser and gas jets are directed at the predetermined portion of coating 6 until the intended amount of coating has been removed.

The laser beam can have a width equal to the predetermined portion to be treated, or it can be narrower, in which case the laser beam is preferably translated across the width of the predetermined portion of the coating during the rotation of the photoreceptor. In a preferred embodiment, the width "a" of laser beam 10 is less than the width "b" of the predetermined portion of coating 6 to be treated. The laser source is mounted on a carriage (not shown) so as to be movable up and down in the directions of arrow B (parallel to axis 8) during rotation of drum 2. To ablate the coating, as drum 2 rotates, laser beam 10 and the fluid jets are impinged on the upper edge of the circumferential strip and then translated downward to the bottom edge of photoreceptor drum 2, so as to cover the width "b" of the predetermined portion of coating 6. Alternately, laser beam 10 and the fluid jets can be translated from the lower edge of drum 2 toward the upper edge of the circumferential strip. Preferably, laser ablation begins at the top of the predetermined portion of the coating to be removed, and the laser beam is translated toward the end of the photoreceptor. The fluid jets are preferably directed at the photoreceptor to push the ablated coating off the end of the photoreceptor during the treatment. This prevents the ablated coating material from resettling on the untreated portion of the coating. A suction exhaust system (not shown) is preferably used to capture the particulate debris and remove it from the treatment area. The coaxial fluid jet, if used, moves with the laser beam as the beam is translated over the photoreceptor coating. The cross-jet of fluid, if used, can be moved with the laser beam, or it can be maintained in a stationary position.

The translation speed of laser beam 10 preferably is from about 0.01 inch/second to about 0.5 inch/second. A single pass over the coating is preferred. Laser beam 10 can be translated across the width "b" of the predetermined portion of coating 6 more than once if needed to remove coating material not removed by the first pass of the laser beam.

Optionally, if laser beam 10 has a width "a" less than the width "b" of the circumferential strip, laser beam 10 can be rapidly oscillated up and down in the directions of arrow B to cover the desired width "b" of coating 6 with the laser beam at spot 12.

Figure 3:
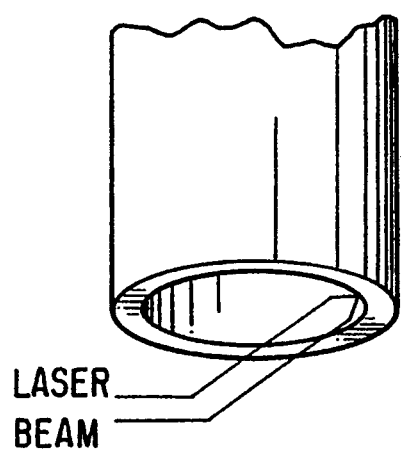
FIG. 3 is a partial plan view showing the removal of a coating from an inner portion of a cylindrical photoreceptor according to the laser ablation embodiment of the invention.

When the desired amount of coating 6 has been removed from the outer predetermined surface(s) of drum 2, the laser and fluid jets can be stopped and reoriented to impinge upon any selected inner surface(s) of drum 2. In the case of a cylindrical photoreceptor, the outer and inner peripheral surfaces of the photoreceptor are preferably treated to remove the coating from the photoreceptor. FIG. 3 is a partial plan view showing the removal of a coating from an inner portion of a cylindrical photoreceptor according to the laser ablation embodiment of the invention. Once the inner and/or outer predetermined portions have been treated, the process is stopped and drum 2 is removed from the chucking device for further processing or use.

Figure 4:
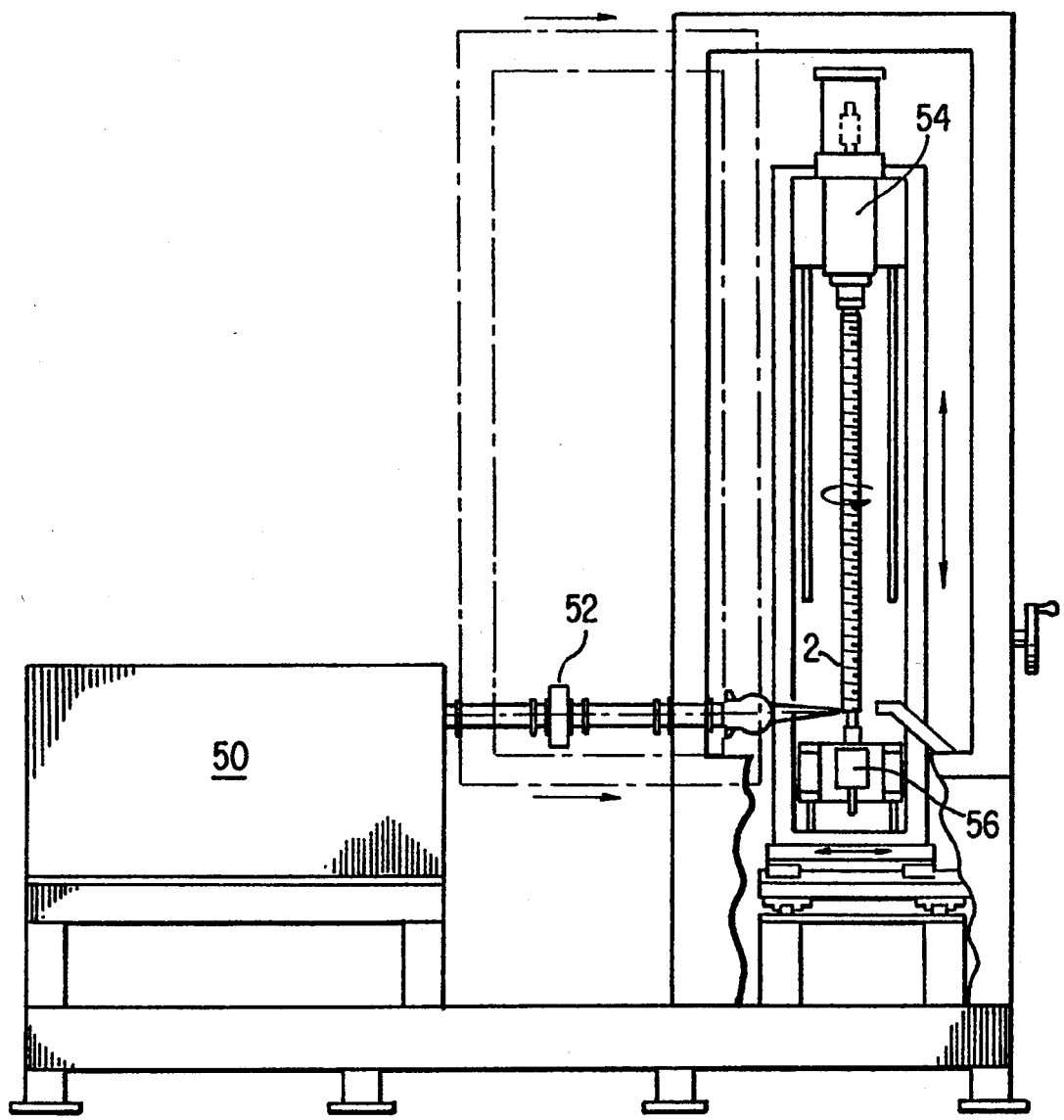
FIG. 4 is a side view of a laser system for removing a coating from a photoreceptor according to the laser ablation embodiment of the invention.
Figure 5:
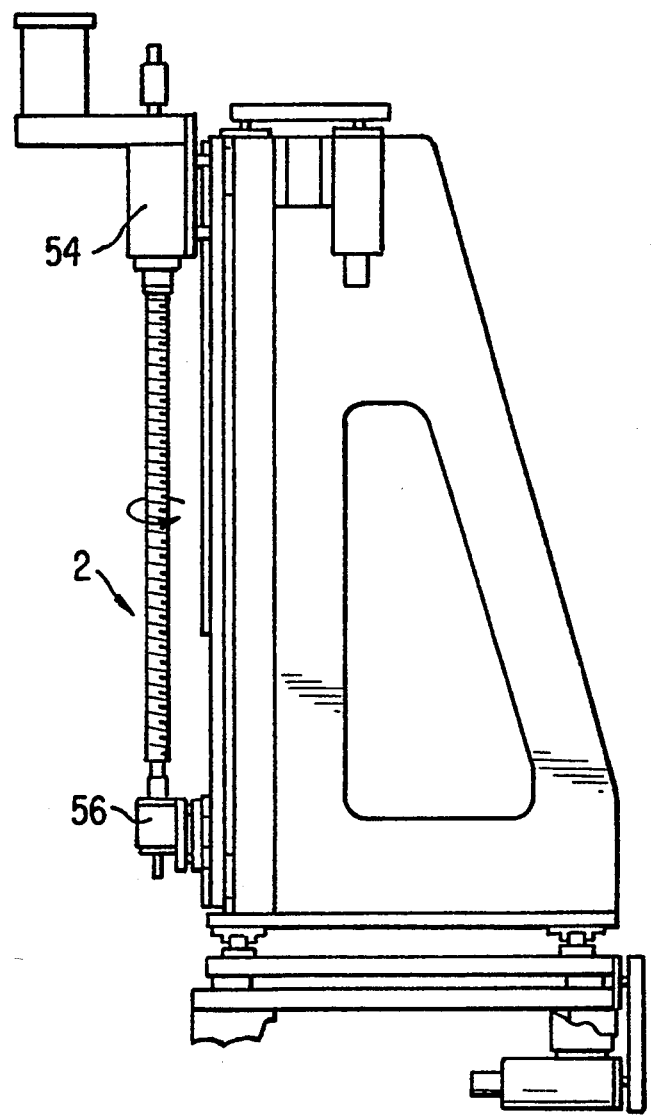
FIG. 5 is a side view of the laser system of FIG. 4.

FIG. 4 is a side view of a suitable laser system for removing a coating from a photoreceptor according to a laser ablation embodiment of the invention. Referring to FIG. 4, the apparatus includes a laser section 50 including a $CO_2$ continuous wave laser, an optical train 52 for directing and concentrating the laser beam, and a material handling section 54 for supporting and rotating photoreceptor 2. Material handling section 54 includes a removable tailstock 56, allowing the inner peripheral ends of photoreceptor 2 to be treated. FIG. 5 is a side view of the laser system of FIG. 4.

FIG. 6 shows a side view of drum 2 being laser ablated at spot 12 on coating 6. Cross-jet gas nozzle 9 directs a high-velocity gas at spot 12 to force molten coating material off the end of drum 2. As shown, nozzle 9 is preferably oriented at an angle $\theta°$ from the outer surface of coating 6. The angle $\theta$ of orientation of cross-jet gas nozzle 9 is preferably from about 0° to about 90° from the surface of coating 6, most preferably from about 15° to about 45°. The cross-jet gas also has a second angle associated with it, measured from the line of action of the laser beam. This angle is preferably from about 15° to about 60°, most preferably from about 30° to about 45°.

Figure 7:
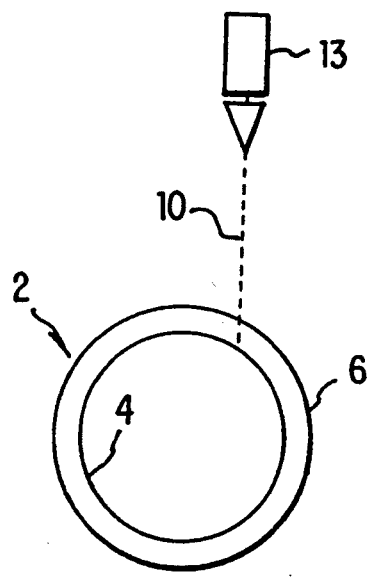
FIG. 7 illustrates a preferred orientation of the laser used according to the laser ablation embodiment of the invention.

FIG. 7 illustrates a preferred laser orientation. Laser beam nozzle 13 is preferably oriented such that laser beam 10 intersects both coating 6 and substrate 4. The laser beam can be directed at the coating at various angles to provide an adequate absorption of the laser energy by coating 6. Absorption of the laser energy by substrate 4 should be minimized. Also, the laser beam should not be directed along a diameter of photoreceptor 2 because this may cause the laser beam to reflect off of substrate 4 directly back into the laser, possibly damaging the laser.

The laser ablation process removes all or a portion of the coating layers as well as materials contained within the ablated coating, such as pigments, adhesives, solvents, binders, conductive particles of metal oxides, and the like. The process obviates the need to further treat drum 2 with chemical solvents or mechanical cleaning means.

A variation of the laser ablation process involves treating a predetermined portion of a coating on a photoreceptor to remove at least part of the coating by directing a source of high intensity heat at the coating in the presence of at least one fluid medium to remove at least part of the coating. The source of high intensity heat can be selected from a controlled flame such as an oxyacetylene torch or an oxyhydrogen torch, superheated gases such as superheated air, superheated pure nitrogen, superheated pure oxygen or other chemically reactive gases, electrical discharges such as arcs or plasmas, or other sources of high intensity heat known in the art. The at least one fluid medium is preferably at least one gas jet. Other aspects of this embodiment are the same as the laser ablation process described above.

Figure 8:
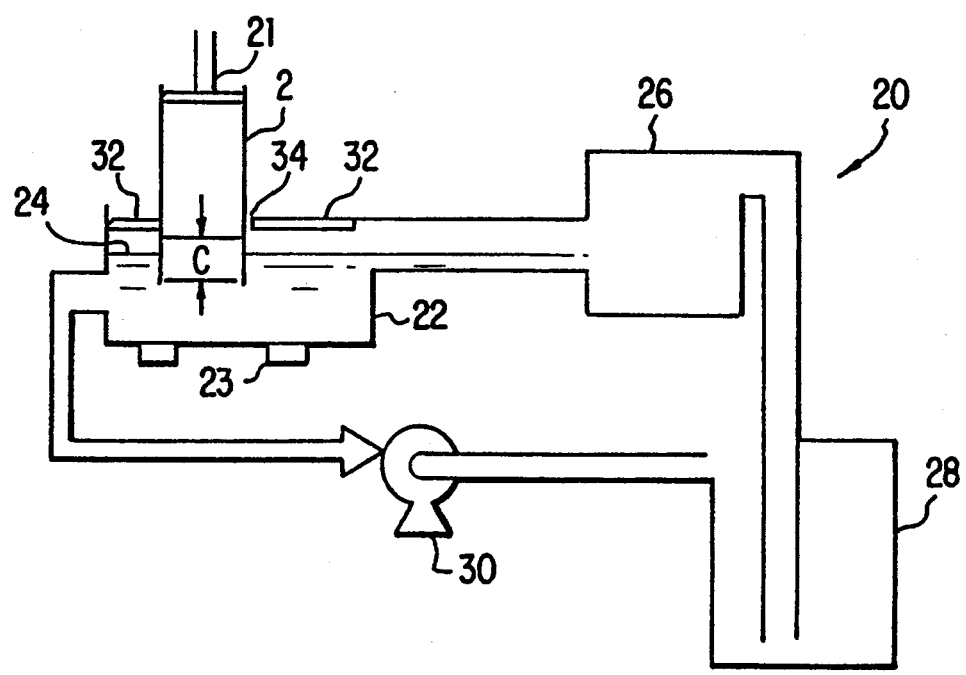
FIG. 8 shows an apparatus for removing a photoreceptor coating using solvent and ultrasonic energy according to another embodiment of the present invention.

FIG. 8 shows an embodiment of the invention in which ultrasonic energy is the source of high energy irradiation and a solvent is the at least one fluid medium. Treatment of the photoreceptor coating according to this embodiment is preferably carried out by lowering the photoreceptor into a container of solvent to a depth sufficient to submerge a predetermined portion of the coating, and directing ultrasonic energy into the container of solvent to remove at least part of the coating. The invention provides apparatus suitable for carrying out this process. The apparatus includes a container for holding a solvent, a movable holder for lowering a photoreceptor having a coating into the container to a depth sufficient to submerge a predetermined portion of the coating in the solvent, and a source of ultrasonic energy for imparting ultrasonic energy to solvent in the container to remove at least part of the coating from the predetermined portion of the coating.

Referring to FIG. 8, a solvent circulation system, generally designated 20, includes a dip tank 22 containing a solvent 24 suitable to remove coating 6, a solvent still 26, a recirculation holding tank 28, and a recirculation pump 30. Ultrasound transducers 23 are provided on dip tank 22 for imparting ultrasonic energy into solvent 24. Useful solvents for removing photoreceptor coatings are well known in the art and include, for example, methylene chloride and trichloroethylene. The solvent circulation system 20 forms a preferred closed system in which the solvent can be distilled and reused. Drum 2 may be mounted on a chucking device 21 engaged with a drive arrangement (not shown) in the same manner as in the laser ablation embodiment. Drum 2 is lowered into the solvent bath through an aperture 34 of shield plate 32 mounted just above the surface of solvent 24. Drum 2 is lowered to a depth "c" to submerge a predetermined portion of drum 2 in the solvent. Depth "c" corresponds to the width "b" of a predetermined portion of drum 6.

In operation, ultrasound waves from ultrasound transducers 23 are directed at solvent 24 in dip tank 22. This ultrasonic energy agitates solvent 24 in the vicinity of the submerged end of drum 2, causing the submerged portion of coating 6 to rapidly dissolve in solvent 24. The process dissolves the coating from both the outer and inner surfaces of the predetermined portion of drum 2. The dissolved coating material is transported away from the photoreceptor by the solvent circulation system. The diameter of aperture 34 is marginally larger than the outer diameter of drum 2, so that shield plate 32 prevents droplets or vapor from solvent 24 from attacking the portion of the coating 6 that is above shield plate 32.

Once the coating 6 has been removed from the predetermined portion of drum 2, the drum is removed from dip tank 22. If desired, drum 2 can be inverted to treat its other end. Solvent 24 may be recirculated through solvent still 26 into recirculation holding tank 28. The solvent is then pumped back to ultrasonic dip tank 22 by pump 30. In this way, fresh solvent is always available for ultrasonic dip tank 22, greatly reducing the need to change the solvent in the system. It will be understood that the treatment can be carried out as a batch or continuous process.

EXAMPLES 1-9

Laser Ablation of Photoreceptor Coating

Several photoreceptors are prepared by coating cylindrical substrates. A base coating layer is formed using isopropyl alcohol and butenol solvents, and a randomized copolymer. A middle coating layer is formed using a binder resin and dibromoanthanthrone pigment. A top coating layer is formed using a chlorobenzene solvent, a polycarbonate binder resin and a diamine transport molecule.

The photoreceptors are treated according to the process of the invention. A continuous wave $CO_2$ laser is used. The laser provides a laser beam having a diameter of 0.0058 inches after focusing. The laser's focus is about ±0.75 mm from the point of sharp focus. The photoreceptors are mounted in a chucking device, rotated, and the laser beam is impinged on a peripheral end of each of the photoreceptors to remove different widths of coatings. Treatment conditions are varied as follow:

| Example | Laser Power (W) | Spindle Speed (rpm) | Traverse Speed (ipm) | Coaxial Gas (psi) | X-Jet Gas (psi) | Treatment Time (sec) |
|---|---|---|---|---|---|---|
| 1 | 1500 | 4000 | 5.5 | 100 | 300 | 4 |
| 2 | 1500 | 4000 | 3.88 | 100 | 300 | 6 |
| 3 | 1700 | 4000 | 5.5 | 60 | 300 | 4 |
| 4 | 1700 | 4000 | 11 | 60 | 300 | 2 |
| 5 | 1700 | 4000 | 22 | 100 | 300 | 1 |
| 6 | 1500 | 2000 | 5.5 | 100 | 300 | 4 |
| 7 | 1900 | 4000 | 5.5 | 100 | 300 | 4 |
| 8 | 1900 | 2000 | 22 | 100 | 200 | 1 |
| 9 | 1500 | 4000 | 8.5 | 80 | 200 | 3 |

The treatments result in a satisfactory removal of all of the coating layers from a peripheral end of the photoreceptor. Most of the photoreceptors do not require further treatment, as all of the coating in the treated region is removed by a single pass of the laser beam. A partial or complete second pass with the laser beam can be carried out to remove any residual coating material left behind by the first pass of the laser beam. The translation speed of the laser beam can be slowed down on the second pass if greater laser energy is needed to remove the residual coating material.

The invention thus provides a process for successfully removing at least part and preferably all of the coating layers at selected areas such as the inner and/or outer peripheral ends of a photoreceptor. The laser ablation and heat processes eliminate the need to chemically or mechanically treat an ablated photoreceptor coating. The invention eliminates the need for masking of the photoreceptor ends during the coating process. In dip coating processes, the invention eliminates the conventional bottom edge wipe step. The process simplifies the manufacture of photoreceptors, facilitates automation, produces higher product yields, and requires few moving mechanical parts. The invention minimizes the rate of solvent usage and the amount of solvent waste.

The foregoing embodiments are intended to illustrate and not limit the invention. It will be apparent that various modifications can be made without departing from the spirit and scope of the invention as defined by the appended claims.

What is claimed is:

1. A process for treating a selected portion of a coating on a photoreceptor to remove at least part of the coating, comprising directing a laser beam at the coating in the presence of at least one fluid jet comprising a cross-jet of gas, to remove at least part of the coating from a selected portion of the coating, the at least one fluid jet exerting sufficient force on the coating to assist in the removal of the coating.

2. The process of claim 1, wherein the cross-jet gas has a pressure of from about 20 psi to about 400 psi.

3. The process of claim 1, wherein the at least one fluid jet further comprises a coaxial fluid jet that travels coaxially with the direction of travel of the laser beam.

4. The process of claim 3, wherein the coaxial fluid jet is a jet of gas that has a pressure of from about 5 psi to about 150 psi.

5. The process of claim 1, wherein the fluid jet comprises air or oxygen gas.

6. The process of claim 1, wherein the fluid jet comprises nitrogen gas.

7. The process of claim 1, wherein the photoreceptor is rotated about an axis perpendicular to the laser beam during the removal of the coating.

8. The process of claim 7, wherein the width of the laser beam is less than the width of the selected portion of the coating and the laser beam is translated over the width of the selected portion of the coating to remove at least part of the coating.

9. The process of claim 1, wherein the laser beam is provided by a continuous wave carbon dioxide laser.

10. The process of claim 9, wherein the photoreceptor includes an aluminum substrate, and the laser has a power of from about 800 W to about 2000 W.

11. The process of claim 10, wherein the photoreceptor includes a nickel substrate, and the laser has a power of from about 100 W to about 400 W.

12. The process of claim 1, wherein the photoreceptor includes a cylindrical substrate, and the laser beam is directed at the coating at an angle tangential to a surface of the cylindrical substrate.

13. The process of claim 1, wherein the coating comprises an organic photoconductor coating.

14. The process of claim 1, wherein the selected portion of the coating is located at a peripheral end of the photoreceptor.

15. A process for removing a selected portion of a coating from a photoreceptor, comprising rotating a photoreceptor about an axis, and directing a laser beam from a continuous wave carbon dioxide laser at a selected portion of a coating on the photoreceptor while concurrently directing a cross-jet of gas having a pressure of from about 20 psi to about 400 psi at the selected portion of the coating to remove the selected portion of the coating from the photoreceptor.

16. The process of claim 15, wherein the cross-jet of gas has a pressure of from about 100 psi to about 300 psi.

17. The process of claim 15, wherein the photoreceptor includes an aluminum substrate, and the continuous wave carbon dioxide laser has a power of from about 800 W to about 2000 W.

18. The process of claim 15, wherein the photoreceptor includes a nickel substrate, and the continuous wave carbon dioxide laser has a power of from about 100 W to about 400 W.

19. The process of claim 15, wherein the photoreceptor includes a cylindrical substrate, and the laser beam is directed at the coating at an angle tangential to a surface of the cylindrical substrate.

20. The process of claim 15, wherein the coating comprises an organic photoconductor coating.

21. The process of claim 13, wherein the selected portion of the coating is located at a peripheral end of the photoreceptor.

22. The process of claim 15, wherein the photoreceptor is rotated about an axis perpendicular to the laser beam during the removal of the coating.

* * * * *